United States Patent

Bartholomew et al.

[15] 3,697,951

[45] Oct. 10, 1972

[54] PATTERN RECOGNITION BY MULTIPLE ASSOCIATIVE TRANSFORMATIONS

[72] Inventors: Gerald E. Bartholomew; Donald J. Kostuch, both of Rochester, Minn.; Thomas E. Robinson, North Baddesley, England; William S. Rohland, Rochester, Minn.

[73] Assignee: International Business Machines Corporation, Armonk, N.Y.

[22] Filed: May 25, 1971

[21] Appl. No.: 146,763

[30] Foreign Application Priority Data

May 29, 1970 Great Britain..........25,963/70

[52] U.S. Cl. ..340/146.3 Q, 340/173 AM, 340/172.5

[51] Int. Cl. ..............................................G06k 9/00

[58] Field of Search.....340/173 AM, 146.3 Q, 172.5, 340/146.3 S, 146.3 T

[56] References Cited

UNITED STATES PATENTS

| | | | |
|---|---|---|---|
| 3,402,394 | 9/1968 | Koerner et al. | 340/173 AM |
| 3,508,220 | 4/1970 | Stampler | 340/173 AM |
| 3,588,845 | 6/1971 | Ling | 340/173 AM |
| 3,623,015 | 11/1971 | Schmitz et al. | 340/146.3 T |

*Primary Examiner*—Thomas A. Robinson
*Attorney*—Hanifin and Jancin and J. Michael Anglin

[57] ABSTRACT

An input pattern is assigned to one of a plurality of categories by serial associative transformations of an input data string to an output code. Substrings of the data string derived from the pattern are applied as serial search arguments to an associative store containing transformation codes for particular bit sequences. The transformation codes are then used as search arguments for an associative store containing tables for producing a second code from particular sequences of the transformation codes. Additional code levels operate similarly to output a pattern-category code. Stored control keys further control the associative-store operations. A zone-clock associative store detects significant transform-code configurations, and records how much of each pattern has been processed.

15 Claims, 3 Drawing Figures

INVENTORS.
GERALD E. BARTHOLOMEW
DONALD J. KOSTUCH
THOMAS E. ROBINSON
WILLIAM S. ROHLAND

BY [signature]

ATTORNEY

PATTERN RECOGNITION BY MULTIPLE ASSOCIATIVE TRANSFORMATIONS

The present invention relates to pattern recognition systems such as the optical character readers which are described hereinafter as embodiments of the invention. However it must be appreciated that the term pattern recognition system covers any system that will identify any pattern, embedded in an equal or greater pattern, that the system is equipped to identify.

According to the present invention there is provided a pattern recognition system comprising input means for emitting a data string representative of a pattern and a sequence of associative stores connected in series to the input means for systematically transforming the data string by associative searches to a form either of a coded identification of the pattern if the pattern is one which the system is equipped to recognize or to a form indicating recognition failure.

It will be appreciated that if a single associative store were loaded with all possible data strings that could be generated by a given input (say a scanner) from the patterns which the system is intended to identify, recognition could be performed by a single associative search. However, such a store would be prohibitively large. By systematically transforming a data string by a sequence of associative searches performed seriatim in a sequence of associative stores, the aggregate size of such stores will be much smaller than would be the size of the single store previously referred to. This aggregate size can be further reduced by using three state functional memory units of the kind disclosed in our British Pat. specification No. 1,186,703. Such a system has the further advanges that it can be if so desired constructed from substantially uniform circuitry in the form of conveniently sized data stores; it can be operated on a pipe-line basis; it can be tested as a storage system rather than a circuit system; and its sensitivity can be completely altered by reloading the reference data or tables retained in the stores. Further it is possible, by having more than one sequence of associative stores, to arrange for each sequence to operate on its own part of the data string, which makes it possible, for a given set of patterns to be recognized, to leave out of the reference data or tables data relating to non-significant ranges or sub-sets of the data string.

It will be remembered that, while general patterns must be reduced to the form of a data string, such reduction could be effected externally of the recognition system and for the system to receive as an input a data string from whence it matters not.

The present invention will be described further by way of example with reference to embodiments of the invention as illustrated in the accompanying drawings in which:

FIG. 1 illustrates the basic construction of an optical character reader, which is one form of pattern recognition system according to the present invention. As shown, the reader comprises a scanner 10 and a sequence of five associative stores 11, 12, 13, 14 and

Figure 2:
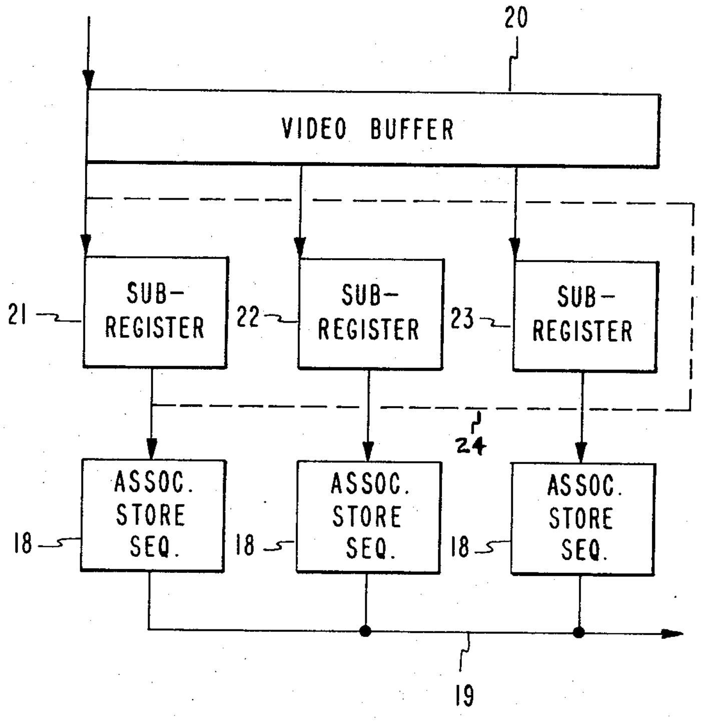
FIG. 2 is a diagram of another form of character reader according to the present invention.

15 connected in series to the scanner 10. The output from the reader is taken from store 15 on data line 16 and the reader is controlled by a control system indicated by lines 17. Each store 11 to 15 contains tables, and data fed into the store can be used to address the contained tables and cause output data to be produced which is a transform of the input data.

The scanner 10 is used to scan a pattern which it is hoped is one that the reader is equipped to recognize and transduce the pattern to the form of a bit string. This bit string is transformed in five successive stages, each stage using one of the stores 11 to 15 until it is in a form which either identifies the pattern or indicates that the pattern is one which the reader is not equipped to recognize. Thus the output data from store 15 is in EBCDIC for example, invalid codings signifying failure to recognize.

It will be apparent that the scanner 10 is a conventional unit as for example a flying spot scanner, and any equipment added to the reader by connection to line 16 is of no real interest to the present invention save that it will determine the form of the output code from store 15. For example, the output from store 15 could be required to be in form of appropriate instructions rather than a coded form of the pattern.

The true recognition function is performed by the stores 11 to 15 and thus can be changed at will by reloading the stores. From a practical point of view, the data paths will not normally accept a complete data string, so that each store 11 to 15 will accumulate its own transform and transmit this transform section by section. However, it will be appreciated that once a store has been emptied of a particular transform, it is free to start accumulating another transform so that the reader is capable of operating on a "pipe-line" basis.

The store sizes can be reduced by using three state functional memory units of the kind disclosed in commonly owned British Pat. specification No. 1,186,703 (U. S. application, Ser. No. 825,455), since logical operations can be performed on simultaneously read-out data from such stores, and the third or "don't care" state simplifies the tables that must be stored. Further, it is possible to re-enter transform data into the store producing it which reduces the storage area required to accumulate the transform, and control of such stores is partially by control keys which can be used as part of the search argument and can supply a selection function in a simplified manner.

Referring to FIG. 2, it will be seen that advantages can be gained in certain circumstances by using parallel sequences of associative stores. Each of the three blocks 18 is a sequence of associative stores similar to the sequence 11 to 15 of the reader of FIG. 1. The output is taken on an output bus 19 common to the three sequences. However, the sequences receive as inputs different parts of the data string entered into a buffer 20 and selected into sub-registers 21, 22 and 23. This means that each sequence 18 need only carry tables relating to certain substrings of the input data string and transforms only those substrings. If so required, however, the whole data string can be entered into the sequences 18 in parallel over a data path 24.

Figure 1:
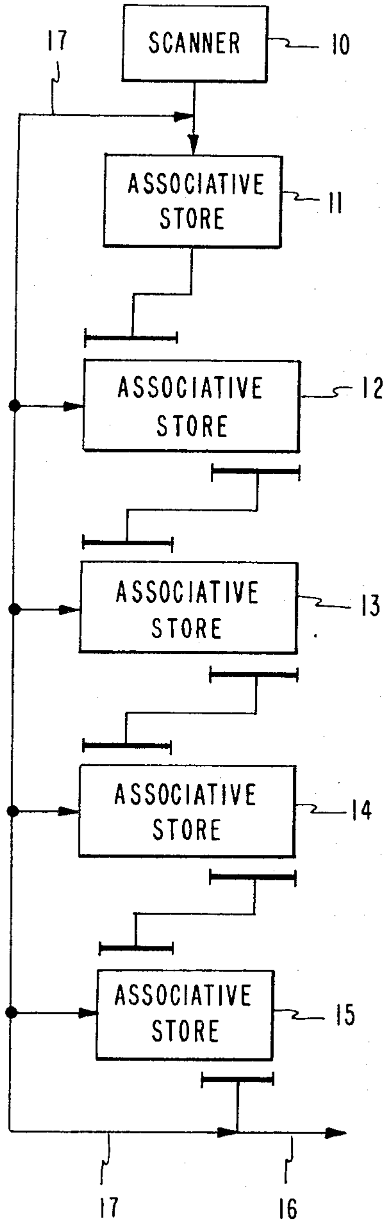
FIG. 1 is a diagram of an optical character reader being one form of pattern recognition system according to the present invention.
Figure 3:
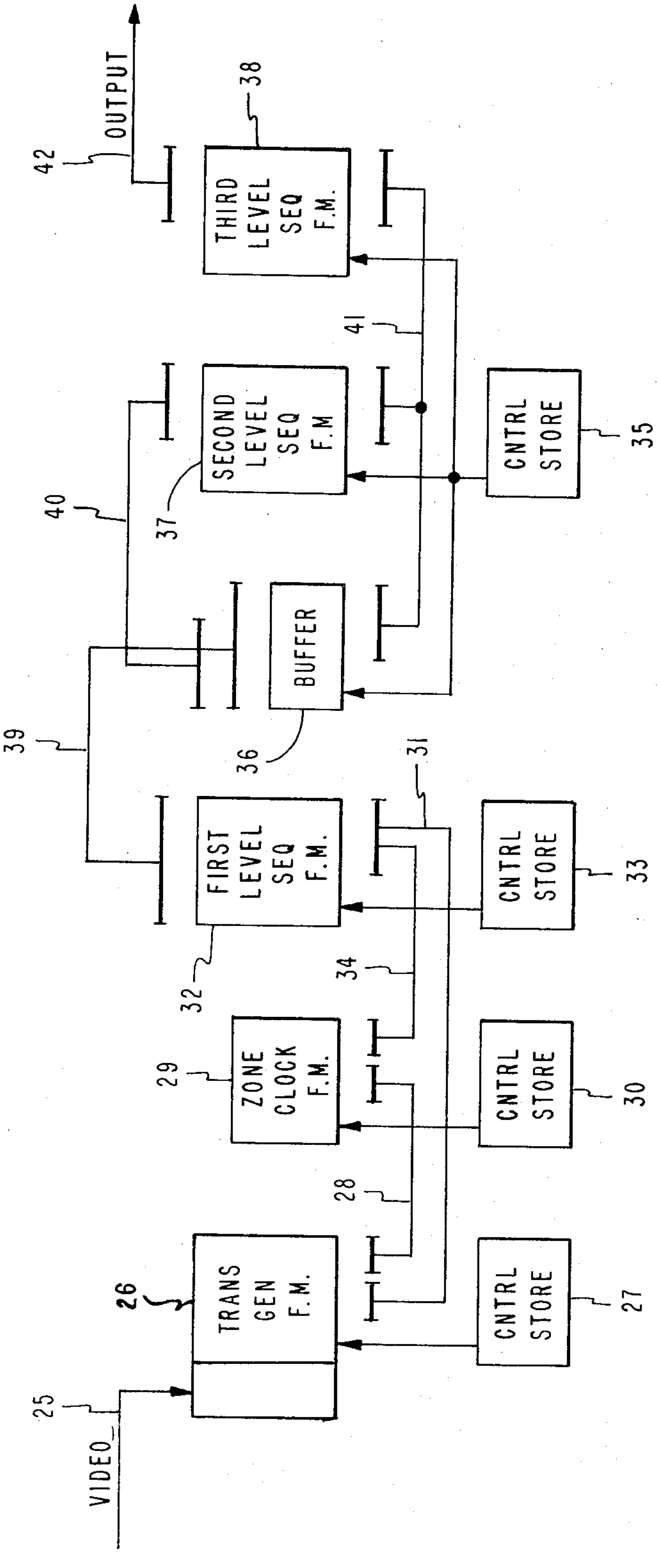
FIG. 3 is a diagram of a third form of optical character reader according to the present invention.

It will be appreciated that the readers illustrated in FIGS. 1 and 2 are very much over simplified and there now follows a more detailed description of a third form of optical character reader according to the present invention, which is illustrated in FIG. 3.

The output lead of a scanner (not shown) feeds into the NEXT line 25 of a functional memory unit 26 controlled by a control store 27. The functional memory unit 26 is connected by data path 28 to a zone clock functional memory unit 29 controlled by a control store 30 and by a data path 31 to a first level sequence functional memory unit 32 controlled by a control store 33. The zone clock 29 is connected by a data path 34 to the memory unit 32.

A control store 35 controls a buffer 36, a second level sequence functional memory unit 37 and a third level sequence functional memory unit 38. Data paths 39, 40 and 41 interconnect memory unit 32 and the buffer 36, the buffer 36 and memory unit 37, and the buffer 36 and the memory units 37 and 38 respectively, with a data output path 42 taken from memory unit 38.

The operation of the reader is as follows:

Each bit supplied to memory unit 26 is tagged onto the bit string already received by a NEXT operation. The function of the memory unit 26 is to generate the transform of the accumulating bit string in an AD HOC code form. This code form is disclosed in U.S. Pat. No. 3,274,551 and in British Pat. specification No. 1,030,919. This requires the generating of a number equivalent to each set of four bits of the accumulating data string, the relative spacing of the four bits of each set being predetermined. However, as an incoming bit completes a set, the set is transformed over data path 28 to memory unit 29 in which, by means of an associative search, the existence of a significant configuration is detected. In other words, only if the set or a number of sets indicates a pattern segment rather than noise, is it worth processing the sets. Thus, when significance is detected, the memory unit 29 feeds back an appropriate key to the memory unit 26 to cause it to generate AD HOC numbers for the set or sets and for subsequent sets (and possibly for some preceding set as well). In fact the key from memory unit 29 is combined with a control key from control store 27 and the data sets to form a search argument for memory unit 26. As the AD HOC numbers are generated, they are fed to memory unit 32 over data path 31.

Thereafter the memory unit 29 counts off the sets across a pattern, indicating as required that a certain percentage of the pattern has been processed.

In memory unit 32, control keys from control store 33 are combined with serially arriving AD HOC numbers from memory unit 26 to form search arguments for associatively addressing the tables in memory unit 32. The results are accumulated in memory unit 32 and transferred when the AD HOC number string is exhausted, via data path 39 to the buffer 36. The transfer is notional "enbloc" but in practice will be in blocks determined by the width of the data path 39. The tables in memory unit 32 contain patterns of AD HOC numbers, and the AD HOC number pattern entered into memory unit 32 is tested against each table, the output from memory unit 32 being an account of which tables were matched and which tables failed to be matched. In other words the output is basically a bit pattern using a "1" for a matched table and a "0" for a failed table, the tables being ordered. Normally some tables will relate only to patterns in the early, middle or late sections of the AD HOC number string and such tables will come into use depending on an appropriate count received from the memory unit 29.

A typical table in memory unit 32 will contain an entry value consisting of a zone count (memory unit 29) and a control key (control store 33). If these are present, a marker will be moved to the next level of the table. This level of the table will contain the first AD HOC number of the sequence associated with the table as a "HIT" entry and a term responding to all other AD HOC numbers as an "ABORT" entry. A match with the bit entry for the first AD HOC number received after entry to the table will cause the marker to be moved to the next level of the table, which will contain a "HIT" entry and an "ABORT" entry. The final level of a table, which will normally have many levels, will contain a read-out code and a key which will only match a read-out control key. For each HIT match the marker is moved one level up; for each ABORT match the marker is erased and the entry value always retains a marker. This means that any table can be reentered whenever the condition is satisfied, which can be achieved with functional memory for various zone counts, using one entry including "don't care" values.

If the movable marker resides in the final level when the read out control key is entered, the identity of the table will be read out as a "1" bit plus the read-out control key. In this way the transform of AD HOC numbers to satisfied and unsatisfied tables, i.e., first level table numbers, is achieved.

Buffer 36 is included to smooth out input data-rate fluctuations, the operation of the reader prior to the buffer being forced by the scanner operation.

The operation of the memory units 37 and 38 is a table-number to table-number transformation similar to the AD HOC-number to table-number transformation of memory unit 32, but without the zone clock entry provisions. It has been determined that the four transformations are sufficient to reduce a bit string generated from a character to machine code using AD HOC coding and functional memory units.

It must be appreciated that if the buffer 36 is large enough, the reader prior to the buffer can be allowed to run freely and need not be retarded in dependence on stages subsequent to the buffer, since in general there will be enough non-significant data strings produced by the scanner to permit the overall operation to even out. Memory units 37 and 38 can be run on a pipe-line basis from the buffer 36.

The following observations must be made:

(a) Control Stores 27, 30 and 33 could be a single unit. (b) Control store 35 could be three units or two units, one unit serving buffer 36 and memory unit 37, and the other serving memory unit 38. (c) Buffer 36 could be omitted and/or a buffer could be included in the data path between memory units 37 and 38. (d) A zone clock functional memory unit similar to memory unit 29 could be included between buffer 36 and memory unit 37 and/or between memory units 37 and 38, or the zone clock function could be performed by the control key structure supplied by the control stores. (e) The zone clock functional memory unit 29 could be replaced by a counter, for example; but the advantage of using a functional memory unit is that the codes need not be a mathematically progressive sequence, and it is also possible to provide intermediate bounds for a zone. (f) It is possible to arrange for memory unit 26 to generate AD HOC numbers for all bits sets completed, for memory unit 29 to examine AD HOC numbers for significance and to render memory unit 32 sensitive to those AD HOC numbers supplied to it after significance has been detected, all AD HOC numbers from memory circuit 26 being fed to memory unit 32. Rather than render the memory unit 32 sensitive, certain tables could be so controlled. (g) Although four transformations have been provided for in the reader shown in FIG. 3, as many transformations as are required can be accommodated by extending the length of the memory unit sequence.

(h) It is possible to alter the processing of one sequence of memory units as a result of a particular response of a memory unit of another sequence in a multisequence reader by passing data obtained from the particular response into the control field of the other sequence. One way that this can be achieved is by tagging this data on to the start of the input string entered into the responding memory unit in the selectors of that unit. By using the selectors as a shift register and extending the selectors by an appropriate number of bit positions connected to the sequence being controlled, this data will eventually be supplied to that sequence as data or as control data. Further, the controlled sequence may take immediate notice of such data or may post such data, directly or indirectly, for future action. Such data may be passed to more than one other sequence, and it may be passed during a transformation operation of the controlling memory unit or on readout of the transformation; but its entry into the or each of the other sequences is arbitrary. This means that specific information about the pattern being transformed can, if positively identified, be used to simplify later transformations. (i) It is possible to alter the processing of a sequence of memory units as a result of a particular response of a memory unit of the same sequence in a manner similar to that described in paragraph (h). Such data can be entered at an earlier point in the sequence or at a later point, and will normally be entered as additional input data to be combined with the data normally entering that point. The limiting case of this consists of a feedback path from the output of a sequence to the input of that sequence, and this means that the sequence can in general be shortened. Data will be continuously transformed as it flows through the sequence, but the transformations effected will be altered in response to the current transform state. (j) Interlimited control and control synchronization can be achieved by feeding data from one control store to one or more other control stores, and this may be done on a response-demand basis. Naturally, a combination of the provisions of paragraphs (h), (k) and (j) is possible, such as data being fed from a memory unit to both another memory unit and a control store. Moreover, such data can be fed back to control the scanner.

While the invention has been particularly shown and described with reference to preferred embodiments thereof, it will be understood by those skilled in the applicable arts that the foregoing and other modifications in form and detail may be made without departing from the spirit and scope of the invention.

We claim as our invention:

1. A method for recognizing an input pattern, said method comprising the steps of:

a. scanning said input pattern so as to derive a string of digits indicative of said pattern, each said digit having one of a plurality of possible values;
b. loading an associative store with a first set of entries indicative of a plurality of first codes, each said first code comprising at least one digit and being associable with at least one possible configuration of the values of the digits in a portion of said string;
c. applying a plurality of said string portions as search arguments to said first set of entries so as to produce a group of first-code digits having values associated with said search arguments;
d. loading an associative store with a second set of entries indicative of a plurality of second codes, each said second code comprising at least one digit and being associable with at least one possible configuration of the values of at least some of said first-code digits;
e. applying a plurality of said first-code digits as search arguments to said second set of entries so as to produce a group of second-code digits having values associated with said last-named search arguments; and
f. determining, from the configuration of the values of at least some of said second-code digits, the name of one of a plurality of categories to which said input pattern may belong.

2. The method of claim 1 wherein each digit in said string has one of two possible values.

3. The method of claim 1 wherein said digits in each of said codes have one of at least three possible values.

4. The method of claim 3, comprising the further steps of:

g. separating said digit string into a plurality of predetermined parts; and
h. simultaneously performing steps (b) through (e) on each of said parts, using separate associative stores for each said part.

5. The method of claim 3 wherein the entries in said second set are further associable with a plurality of numbers indicating particular portions of said input pattern, said method comprising the further steps of:

i. accumulating running representations indicating how much of said input pattern has been processed; and
j. applying said representations as further search arguments to said second set of entries, so as to further determine the values of said second-code digits.

6. The method of claim 3, comprising the further steps of:

k. sensing the presence of significant configurations of the values of said first-code digits; and
l. enabling step (e) only after at least one of said significant configurations has been sensed.

7. The method of claim 6 wherein step (k) comprises the steps of:

m. loading an associative store with a set of entries defining a plurality of control keys associable with said significant configurations; and
n. applying a plurality of said first-code digits as search arguments to said last-named set of entries so as to produce said control keys for said significant configurations.

8. The method of claim 7 wherein step (l) comprises applying said control keys as further search arguments to said second set of entries.

9. The method of claim 3, comprising the further steps of:

o. storing at least one set of control keys; and
p. applying a predetermined sequence of said control keys as further search arguments to at least one of said sets of entries, so as to further determine the values of the digits of said one code.

10. The method of claim 9 wherein step (o) comprises storing a plurality of said control-key sets corresponding to respective ones of said sets of entries, and wherein step (p) comprises applying each said control-key set to its corresponding set of entries.

11. The method of claim 9 wherein step (p) comprises applying said one control-key set to more than one of said sets of entries.

12. The method of claim 3 wherein step (f) comprises the steps of:

q. loading an associate store with a third set of entries indicative of a plurality of third codes, each said third code comprising at least one digit and being associable with at least one possible configuration of the values of at least some of said second-code digits;
r. applying a plurality of said second-code digits as search arguments to said third set of entries so as to produce a group of third-code digits having values associated with said last-named search arguments; and
s. determining, from the configuration of the values of at least some of said third-code digits, the name of one of a plurality of categories to which said input pattern may belong.

13. The method of claim 12, comprising the further steps of:

t. storing a set of control keys; and
u. applying a predetermined sequence of said control keys as further search arguments to said third set of entries, so as to further determine the values of the digits of said third code.

14. The method of claim 12 wherein step (s) comprises the steps of:

v. loading an associative store with a fourth set of entries indicative of a plurality of fourth codes, each said fourth code comprising at least one digit and being associable with at least one possible configuration of the values of at least some of said second-code digits;
w. applying a plurality of said third-code digits as search arguments to said fourth set of entries so as to produce a group of fourth-code digits having values associated with said last-named search arguments; and
x. determining, from the configuration of the values of at least some of said fourth-code digits, the name of one of a plurality of categories to which said input pattern may belong.

15. The method of claim 14, comprising the further steps of:

y. storing a set of control keys; and
z. applying a predetermined sequence of said control keys as further search arguments to said fourth set of entries, so as to further determine the values of the digits of said fourth code.

* * * * *